United States Patent Office 3,364,051
Patented Jan. 16, 1968

3,364,051
PLASTIC COATED EMBOSSING
ROLL AND METHOD
Frank W. Broderick, P.O. Box 2,
Stirling, N.J. 07980
No Drawing. Filed Feb. 19, 1965, Ser. No. 434,190
4 Claims. (Cl. 117—8)

This invention relates to a plastic coated roll for embossing a roll of foil or foil laminate and more particularly to a pair of mated embossing rolls one of which is plastic coated.

In the past, rotary register embossing of foil laminates and paper has been accomplished in line by (a) rotary printing stations using engraved matched hardened forged steel rolls mated with herringbone gears, (b) by use of a female engraved steel chrome plated roll mated to a vinyl coated roll thru suitable gears followed by a curing process and (c) by use of a female engraved steel chrome plated roll in conjunction with a free running rubber or polyurethane plastic roll. Not one of these methods is entirely satisfactory.

The (a) or matched hardened forged steel roll combination is very expensive, requires considerable time and skill to set up in a press and causes tears and web breaks with the slightest misalignment.

The (b) or vinyl coated and steel roll combination presents disadvantages due to the difficulty of maintaining uniform curing temperatures across the entire roll face of the vinyl coating during the curing and mating procedure. Harmful variations of the curing temperature range are created by the metal masses in the journal inserts and by the conductivity loss of temperature thru journal and frame contacts. Such losses are fatal to uniform curing of vinyl coatings and thus limit the use of this (b) combination to large patterns, preferably located at least 6 inches from the ends of each roll. Moreover, care must be taken with vinyl rolls during cleaning operations since the vinyl coating is soluble in many of the solvents commonly used to clean embossing rolls.

The (c) or free running rubber or polyurethane plastic combination presents difficulties which yield poor embossing or bursting of the web when pressure for deep embossing is applied. This condition is created by the condition that the greater the pressure exerted by the steel roll against the rubber or polyurethane back-up roll the greater is the deformation of the back-up roll so that the peripheral speed of the web increases above normal web tension speed immediately before, after and thru the direct point of tangency of pressure contact. Actually, the back-up roll material in contact with the web is moving faster in these areas than either the web or the balance of the covering of the back-up roll, such speed up movement being generated by compression of the engraved roll thru the web to the back-up roll, resulting in increased peripheral speed and decreased gap due to rotative distortion of the back-up roll. The result of this unbalance between engraved steel roll and the free running back-up roll distorts and breaks the web especially in those areas where the engraved roll and free running rubber or polyurethane roll require heavier pressure due to their use as pull or tension control rolls.

It is an object of this invention to produce a plastic coated male back-up embossing roll having none of the defects of the prior art.

It is another object to provide a back-up roll having a compressible paper pulp base coated with a plastic coating of suitable thinness.

These and other objects of this invention will become apparent upon reading the following descriptive disclosure.

A conventional steel roll is engraved in the conventional manner either by photo engraving or machine engraving after which it may be hardened or chrome plated in the conventional manner. This roll may be a male or a female roll. For example, a female roll having a diameter of 10.000 inches is provided. A mating male roll is then prepared having an outside diameter .030 inch less than the female roll of 10.000 inches. The outside diameter of the male roll therefore is 9.970 inches. To this male roll of 9.970 inches there is laminated a loose pulp board of .024 inch in thickness. While board lamination is preferred, any composition such as plastic, cardboard or other material which may be laminated to the male metal roll may be used providing it is compressive under pressure. After the pulp has been securely laminated to the metal roll it is dampened with a solvent; in the case of cardboard with water; in the case of vinyls with methyl ethyl ketone, etc., and it is then geared to the female roll and rotated under pressure until the pitch diameter of the roll is compressed to 9.995 inches. That portion of the damp paper pulp which is forced into the female cavities will not compress materially and the outside diameter of this portion of the male roll will be 10.018 inches. This outside diameter dimension is taken at the top of the protuberances and the pitch diameter is taken at the bottom of the protuberances. At this stage the rolls will emboss foil laminate but the male roll could be easily damaged by splices, creases and similar imperfections passing between them. Therefore to the compressed pulp male roll surface there is added polyurethane by means of spray or other conventional manner to a thickness approximately 50% greater than the foil laminate material to be run. For example, when a .003 inch thick paper and foil combination is used, then the polyurethane coating would be approximately .0045 inch thick.

This coating is now cured to the previously laminated and mated pulp paper by curing for several hours at about 270° F. The time and temperature of curing varies greatly with the addition of different plasticizers to the spray. After curing the rolls are rotated together in such a manner that the soft pulp protuberances compress with the polyurethane to a height of .012 inch and the pitch diameter increases to 10.000 inches giving a perfectly mated set of rolls, the top roll being steel and either hardened or chrome plated and the bottom roll being metal laminated with pulp to preserve the pattern and coated with polyurethane to resist web breakage and bursting and damages due to creases, splices and solvents.

According to this invention a suitably thin layer of resilient plastic is bonded to a laminate layer of a non-metallic composition. The preferred plastic layer is of polyurethane but other plastic compositions are operable.

This invention has been described by means of an illustrative embodiment thereof but clearly it is of broader scope.

I claim:
1. The method of preparing a back-up roll to prevent damage thereto and adapted to mate with a female embossing metal roll comprising laminating a resilient composition board to a steel roll of suitably smaller outside diameter to produce an overall diameter slightly less than the pitch diameter of said female embossing roll, moistening said composition board with a suitable solvent, rotating said moistened roll in contact with said female roll to obtain a pitch diameter of the male roll a few thousandths of an inch less than that of the female roll, adding a thin layer of flexible plastic to said composition board, curing said plastic layer at a suitable temperature for a suitable time to produce a male back-up roll having the pitch diameter of the female roll.
2. The method of claim 1 wherein a polyurethane layer of plastic is added by spraying a solution thereof.

3. The method of claim 1 wherein a polyurethane layer of plastic is added by dipping a solution thereof.

4. The method of claim 2 wherein the thickness of the sprayed polyurethane layer is fifty to one hundred percent greater than the sheet material to be run between the embossing rolls.

References Cited

UNITED STATES PATENTS 805,699  11/1905  Avril _____ 101—23

ALFRED L. LEAVITT, *Primary Examiner.*

C. R. WILSON, *Assistant Examiner.*